United States Patent
Shi et al.

(10) Patent No.: US 8,693,540 B2
(45) Date of Patent: Apr. 8, 2014

(54) METHOD AND APPARATUS OF TEMPORAL ERROR CONCEALMENT FOR P-FRAME

(75) Inventors: Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1550 days.

(21) Appl. No.: 11/373,596

(22) Filed: Mar. 9, 2006

(65) Prior Publication Data
US 2006/0215761 A1   Sep. 28, 2006

Related U.S. Application Data

(60) Provisional application No. 60/660,867, filed on Mar. 10, 2005, provisional application No. 60/680,277, filed on May 11, 2005.

(51) Int. Cl.
*H04N 7/12* (2006.01)

(52) U.S. Cl.
USPC ............ 375/240.16; 375/240.12; 375/240.27; 375/240.13; 348/416.1

(58) Field of Classification Search
USPC ............. 375/240.16, 240.12, 240.13, 240.27; 382/190; 348/416.1
See application file for complete search history.

(56) References Cited

U.S. PATENT DOCUMENTS

| | | | |
|---|---|---|---|
| 5,241,546 A | 8/1993 | Peterson et al. | |
| RE34,810 E | 12/1994 | Lemaine et al. | |
| 5,504,732 A | 4/1996 | Gregg et al. | |
| 5,633,870 A | 5/1997 | Gaytan et al. | |
| 5,878,217 A | 3/1999 | Cherukuri | |
| 6,026,506 A | 2/2000 | Anderson et al. | |
| 6,335,985 B1 * | 1/2002 | Sambonsugi et al. | 382/190 |
| 6,490,705 B1 | 12/2002 | Boyce | |
| 6,516,441 B1 | 2/2003 | Kim et al. | |
| 6,530,055 B1 | 3/2003 | Fukunaga | |
| 6,553,540 B1 | 4/2003 | Schramm et al. | |
| 6,804,494 B2 | 10/2004 | Fernandez-Corbaton et al. | |

(Continued)

FOREIGN PATENT DOCUMENTS

| | | |
|---|---|---|
| CL | 8571995 | 6/1995 |
| CL | 1141996 | 1/1996 |

(Continued)

OTHER PUBLICATIONS

Aign, S, et al.: "Temporal & Spatial Error Concealment techniques for Hierarchical MPEG-2 Video Codec," Communications—Gateway to Globalization. Proceedings of the Conference on Communications, pp. 1776-1783; Seattle, Jun. 18-22, 1995.

(Continued)

*Primary Examiner* — Eva Puente
(74) *Attorney, Agent, or Firm* — Fulbright & Jaworski LLP (57) ABSTRACT

A method and apparatus of processing a multimedia frame comprising a first section received in error are disclosed. The method comprises obtaining temporal prediction data corresponding to a first reference frame. The method further comprises determining whether the first reference frame is reliable for estimating the first section. The method further comprises estimating the first section received in error based on one or more sections other than the first section of the multimedia frame and the first reference frame, if it is determined that the first reference frame is reliable.

110 Claims, 8 Drawing Sheets

(56) References Cited

U.S. PATENT DOCUMENTS

| | | | |
|---|---|---|---|
| 7,180,843 B2 | 2/2007 | Furuta et al. | |
| 7,197,692 B2 | 3/2007 | Sutivong et al. | |
| 7,450,610 B2 | 11/2008 | An | |
| 2002/0063807 A1 | 5/2002 | Margulis | |
| 2002/0071485 A1 | 6/2002 | Caglar et al. | |
| 2003/0215014 A1* | 11/2003 | Koto et al. | 375/240.16 |
| 2004/0071354 A1* | 4/2004 | Adachi et al. | 382/236 |
| 2004/0243904 A1 | 12/2004 | Kim et al. | |
| 2005/0030207 A1* | 2/2005 | Craven et al. | 341/76 |
| 2005/0129128 A1 | 6/2005 | Chou et al. | |
| 2005/0135308 A1 | 6/2005 | Vijayan et al. | |
| 2005/0141475 A1 | 6/2005 | Vijayan et al. | |
| 2005/0160347 A1 | 7/2005 | Kim et al. | |
| 2005/0163211 A1 | 7/2005 | Shanableh | |
| 2005/0275573 A1 | 12/2005 | Raveendran | |
| 2006/0013320 A1 | 1/2006 | Oguz et al. | |
| 2006/0093031 A1 | 5/2006 | Van Der Schaar et al. | |
| 2006/0146934 A1 | 7/2006 | Caglar et al. | |
| 2006/0215539 A1 | 9/2006 | Vrcelj et al. | |
| 2006/0218472 A1 | 9/2006 | Dahl et al. | |
| 2006/0222078 A1 | 10/2006 | Raveendran | |
| 2006/0230162 A1 | 10/2006 | Chen et al. | |
| 2006/0233239 A1 | 10/2006 | Sethi et al. | |
| 2006/0282737 A1 | 12/2006 | Raveendran | |
| 2007/0089021 A1 | 4/2007 | Younkin et al. | |

FOREIGN PATENT DOCUMENTS

| | | |
|---|---|---|
| CL | 19362000 | 7/2000 |
| EP | 0752801 A2 | 1/1997 |
| EP | 1137004 A2 | 9/2001 |
| EP | 1301044 | 4/2003 |
| EP | 1484867 A2 | 12/2004 |
| EP | 1608182 | 12/2005 |
| JP | 62002747 | 1/1987 |
| JP | 06046020 | 2/1994 |
| JP | 09128315 | 5/1997 |
| JP | 09247681 | 9/1997 |
| JP | 2000331424 A | 11/2000 |
| JP | 2001510007 T | 7/2001 |
| JP | 2004096752 | 3/2004 |
| JP | 2004349932 A | 12/2004 |
| JP | 2004364257 | 12/2004 |
| JP | 2005518142 | 6/2005 |
| KR | 20030058472 | 7/2003 |
| KR | 20040076428 | 9/2004 |
| RU | 2219671 | 10/2001 |
| WO | WO9950963 | 10/1999 |
| WO | WO03069834 A1 | 8/2003 |
| WO | WO2004062133 | 7/2004 |
| WO | WO2005022811 | 3/2005 |
| WO | WO2005041515 | 5/2005 |
| WO | WO2005043794 | 5/2005 |
| WO | 2005107421 | 11/2005 |

OTHER PUBLICATIONS

Bansal, P. et al.: "Improved Error Detection and Localization Techniques for MPEG-4 video," 2002 International Conference on Image Processing, pp. 693-696, ICIP 2002. Rochester, NY, Sep. 22-25, 2002.

Sun, H, et al., "Error Concealment Algorithms for Robust Decoding MPEG Compressed Video" Signal Processing. Image Communication, Elsevier Science Publishers, Amsterdam, NL, vol. 10, No. 4, Sep. 1997, pp. 249-268.

International Search Report—PCT/US2006/008489, International Search Authority—European Patent Office—Sep. 12, 2007.

Written Opinion—PCT/US2006/008489, International Search Authority—European Patent Office—Sep. 12, 2007.

Belfiore et al., "Spatiotemporal Error Concealment With Optimized Mode Selection And Application To H.264," Signal Processing, Image Communication, Elsevier Science Publishers, Amsterdam, NL, vol. 18, No. 10, Nov. 2003, pp. 907-923, XP004472764.

Al-Mualla, "Multiple-Reference Temporal Error Concealment," ISCAS 2001, Proceedings of the 2001 IEEE International Symposium on Circuits and Systems, Sydney, Australia, May 2001, IEEE International Symposium on Circuits and Systems, New York, NY, USA, vol. 1, May 2001, pp. 149-152, XP010542054.

Suh et al., "Recovery of Motion Vectors for Error Concealment," Tencon 99, Proceedings of the IEEE Region 10 Conference, Cheju Island, South Korea, Sep. 1999, IEEE vol. 1, pp. 750-753, XP010368320.

Yasuichi Okabe,: "Chapter 3. OSI Reference Model, 4. Session Layer, Presentation Layer and Application Layer," Network Technology Seminar, Detailed Explanation of TCP/IP Protocol, Itmedia Inc., Jul. 19, 2000, URL:http://www.atmarkit.co.jp/fwin2k/network/tcpip003/tcpip05.html.

Taiwan Search Report—TW095108324—TIPO—Apr. 28, 2012.

* cited by examiner

REFERENCE FRAME  CURRENT P-FRAME

METHOD AND APPARATUS OF TEMPORAL ERROR CONCEALMENT FOR P-FRAME

CLAIM OF PRIORITY UNDER 35 U.S.C. §119

The present Application for Patent claims priority to Provisional Application No. 60/660,867 entitled "METHOD OF ERROR RECOVERY FOR A DECODER" filed Mar. 10, 2005, and Provisional Application No. 60/680,277 entitled "METHOD AND APPARATUS OF TEMPORAL ERROR CONCEALMENT FOR P-FRAME" filed May 11, 2005, and assigned to the assignee hereof and hereby expressly incorporated by reference herein.

BACKGROUND

1. Field

This invention relates to methods and apparatus for encoding and decoding digital data with error management.

2. Background

Widespread use of the Internet and wireless communication has increased demand for multimedia services that stream media over the Internet and mobile/wireless channels. In Internet Protocol (IP) networks, video can be provided by a server and can be streamed by one or more wired or wireless clients. Wired connections include dial-up, integrated services digital network (ISDN), cable, digital subscriber line protocols (collectively referred to as xDSL), fiber, local area networks (LAN), wide area networks (WAN) and others. Electronic devices utilizing wireless communications include telephones (e.g., cell phones), personal data assistants (PDAs), hand-held and portable computers and others. In most, if not all of these applications, bandwidth requirements and/or restrictions necessitate that video processing utilize a source encoder incorporating video compression algorithms to analyze, quantify and represent video data to convey the maximum information by expending a "minimum" number of bits. Characteristics of such algorithms vary significantly which leads to large scale variations in their performance (such as compression efficiency and bit rate). Characteristics of video processing using compressions algorithms can vary significantly based on content, which can lead to large scale variations in their performance (such as compression efficiency and bit rate).

Wireless channels are prone to errors. A part of transmitted data is "erroneous" when this part of data is lost or corrupt. Because video compression inherently removes redundancy, the compressed data becomes critical. Any erroneous part of this data during transmission impacts reconstructed video quality at the decoder. The impact is aggravated if the erroneous data is part of the reference frame for motion compensated prediction, causing temporal error propagation.

To alleviate impact on reconstructed video quality due to erroneously received bitstream data, the video decoder processes the received video data to improve video quality. This is referred to as error concealment. Error concealment schemes make use of the spatial and temporal correlation that exists in the video signal. Accordingly, these schemes are called spatial or temporal error concealment.

Depending on the nature of the channel errors (bit errors and/or packet loss) and the type of packetization, all or part of the data pertaining to one or more macroblocks or slices could be erroneous during transmission. For a macroblock, various coded macroblock data could be erroneous that includes one or more of the following: coding mode (inter or intra), motion vectors (if inter), and transform coefficients.

When a macroblock is erroneous, it is typically assumed that all of the above information is erroneous. For an inter-coded macroblock, its motion vectors and residual coefficients are erroneous. Since residual signals are highly de-correlated, they are hard to estimate from neighboring macroblocks. However, studies have shown that reconstructed video quality may be greatly improved if motion vectors can be recovered. Hence, the main goal of temporal error concealment is to estimate the erroneous motion vectors from its spatial and temporal neighbors. Once the motion vector is constructed, motion compensation can then be performed using the constructed motion vector with zero residual coefficients.

Although there are several existing temporal error concealment schemes, they fail to offer good results. Moreover, they are not compatible with a multimedia data stream supporting multiple reference frames and variable motion compensation block sizes. Therefore, a new temporal error concealment scheme is needed to achieve good results and provide wider compatibilities.

SUMMARY

A method and apparatus of processing a multimedia frame comprising a first section received in error are disclosed. The method comprises obtaining temporal prediction data corresponding to a first reference frame. The method further comprises determining whether the first reference frame is reliable for estimating the first section. The method further comprises estimating the first section received in error based on one or more sections other than the first section of the multimedia frame and the first reference frame, if it is determined that the first reference frame is reliable.

DETAILED DESCRIPTION

In the following description, specific details are given to provide a thorough understanding of the disclosed methods and apparatus. However, it would be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
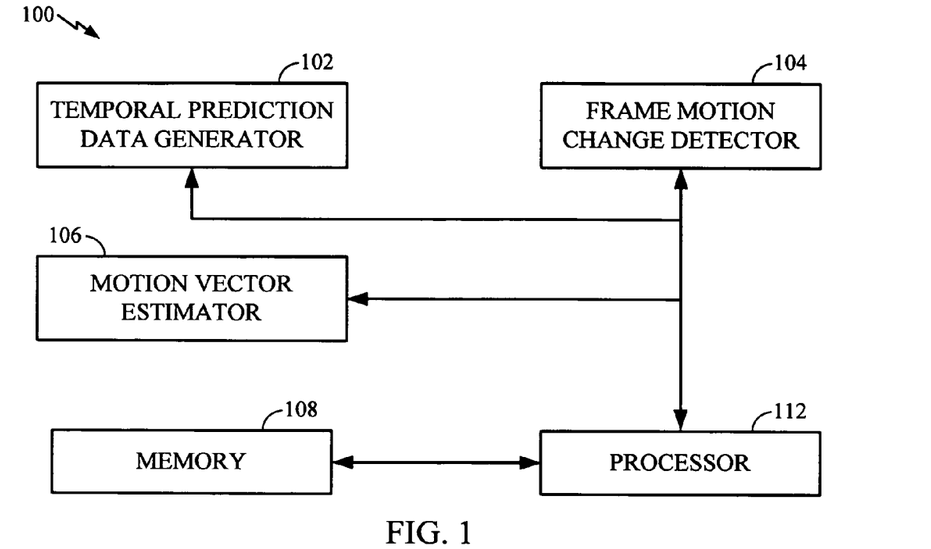
FIG. 1 shows a block diagram illustrating an example of a decoder configured to decode an incoming multimedia data stream (not shown)

FIG. 1 shows a block diagram illustrating an example of a decoder configured to decode an incoming multimedia data stream (not shown). The multimedia data can be of various forms including, but not limited to, video, audio, graphics, text, and pictures. The data can be compressed video and audio as in the MPEG-x and H.26x standards, compressed audio as in the MPEG-4 AAC, MP3, AMR and G.723 audio or voice compression standards, or any other type of digital data. The data stream can be received via a wired network such as telephone, cable, and fiber optic, or a wireless network. In the case of wireless, the network can comprise, for example, part of a code division multiple access (CDMA or CDMA2000) communication system or alternately, the system can be a frequency division multiple access (FDMA) system, an orthogonal frequency division multiplex (OFDM) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques.

The decoder 100 is configured to perform temporal error concealment for erroneous inter-coded data. Inter or predictive coding refers to encoding a picture (a field or a frame) with reference to another picture. Examples of inter-coded pictures used throughout this application are predicted frames (either forward or backward predicted, referred to as "P-frames"). Other terms for inter-coding include high-pass coding, residual coding, motion compensated interpolation and others that are well known to those of ordinary skill in the art. P-frames (or any inter-coded sections) can exploit temporal redundancy between a region in a current frame and a best matching prediction region in a reference frame. The difference between the current region and the best matching reference prediction region is known as residual error (or prediction error). The location of the best matching prediction region in the reference frame can be encoded in a motion vector.

The decoder 100 can also be configured to perform the temporal concealment methods disclosed herein for certain I-frames, if the I-frame is not the first frame in a sequence and if there is no scene change. I-frame refers to an intra-coded frame, which is understood by a person of skill in the art as being encoded without reference to any other fame. Because an I-frame contains no motion information, motion information from the previous P-frame is used to conceal the erroneous I-frame data.

The decoder 100 comprises a temporal prediction data generator 102, a frame motion change detector 104, a motion vector estimator 106, a memory 108 and a processor 112. The temporal prediction data generator 102 is configured to obtain temporal prediction data corresponding to a reference frame from which the P-frame can be predicted. The frame motion change detector 104 is configured to determine whether the reference frame is reliable for estimating an erroneous macroblock by detecting whether there is a significant change in motion from the P-frame to the reference frame. A macroblock is a group of associated pixels, and in this example is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components.

The motion vector estimator 106 is configured to estimate the motion vector for the erroneous macroblock in one of a plurality of ways based in part on whether the reference frame is reliable. The processor 112 may be any suitable general purpose single- or multi-chip microprocessor, or any suitable special purpose microprocessor such as a digital signal processor, microcontroller, or a programmable gate array. The processor 112 is configured to execute one or more software applications to control the operation of the temporal prediction data generator 102, the frame motion change detector 104, and the motion vector estimator 106. The processor 112 is also configured to access the memory 108 to read and save data. In certain examples, either of or both the temporal prediction data generator 102 and the frame motion change detector 104 can be removed.

It should be noted that any one of the functional blocks as illustrated in FIG. 1 may be rearranged or combined with one or more other blocks without changing the function of the decoder.

Figure 2:
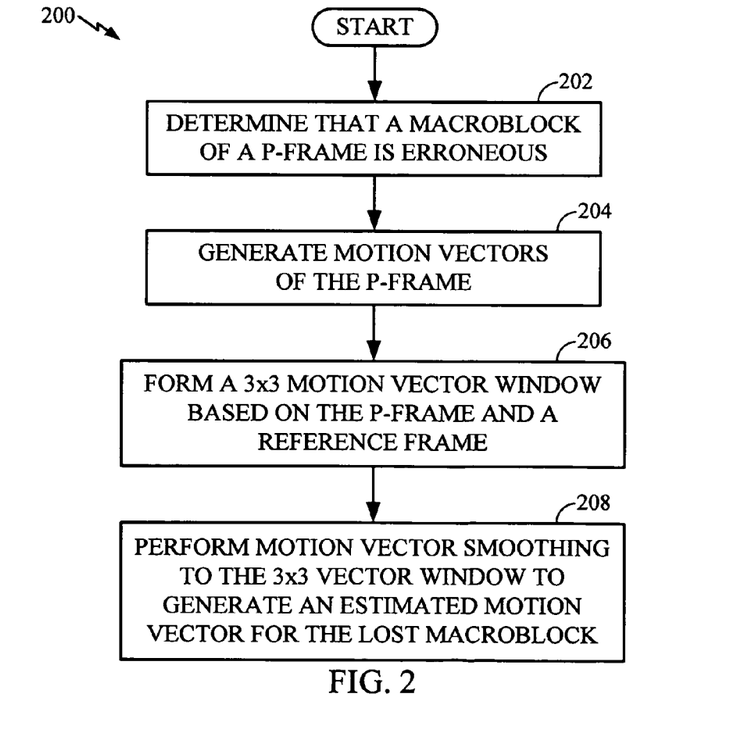
FIG. 2 is a flowchart illustrating an example of a method of temporal error concealment for an erroneous macroblock of a P-frame.

FIG. 2 is a flowchart illustrating an example of a method of temporal error concealment for an erroneous macroblock of a P-frame. The method of temporal error concealment derives an estimate of a motion vector for the erroneous macroblock in the P-frame based on the neighboring macroblocks in the P-frame and the macroblocks in the reference frame or frames.

The method can be applied in either a causal decoding process or a non-causal decoding process. In a causal decoding process, each macroblock is decoded in a determined time order. The decoding of a macroblock is completed before the decoding process moves to the next macroblock. In a non-causal decoding process, the decoding of a current macroblock can be deferred after macroblocks following the current macroblock are decoded.

The method 200 begins at an optional block 202 in which a decoder determines that a macroblock of a received P-frame is in error. Moving to an optional block 204, the decoder generates motion vectors for the correctly received macroblocks of the P-frame. Next at a block 206, the decoder forms a motion vector window by using correctly received motion vectors from the current P-frame and the correctly decoded motion vectors from the reference frames corresponding to the erroneous macroblock of the current P-frame. In this example, the motion vector window contains 3×3 macroblocks, but it is understood that the motion vector window can vary in size from one macroblock and up. Blocks 204 and 206 will be described below in further detail.

Proceeding to a block 208, the decoder performs motion vector smoothing to available motion vectors of the 3×3 motion vector window and generates an estimated motion vector for the erroneous macroblock. In certain examples, the estimate motion vector is a median of the available motion vectors in the 3×3 window obtained by median filtering.

Median filtering is widely used in signal and image processing to remove impulse noises while preserving edges at the same time. To obtain the median for an array of N scalars, $X=(x_1, x_2, \ldots x_n)$, with $x_i \in \Re$, for $i=1, 2 \ldots N$, usually the array is first sorted into $(\hat{x}_1, \hat{x}_2, \ldots \hat{x}_N)$. Then the element in the middle $\hat{x}_{N/2}$ is taken as the median $x_M$ of the array. The median $x_M$ satisfies the following property:

$$\sum_{i=1}^{N} |x_M - x_i| \leq \sum_{i=1}^{N} |x_j - x_i| \quad j = 1, 2, \ldots N \tag{3}$$

Similarly, for an array of N m-dimensional vectors, $V=(\vec{v}_1, \vec{v}_2, \ldots \vec{v}_N)$, with $\vec{v}_i \in \Re^m$, for $i=1,2, \ldots N$ the median vector $\vec{v}_{VM}$ is the vector that satisfies the following constraint:

$$\sum_{i=1}^{N} \|\vec{v}_{VM} - \vec{v}_i\|_p \leq \sum_{i=1}^{N} \|\vec{v}_j - \vec{v}_i\|_p \quad j = 1, 2, \ldots N \tag{4}$$

where p denotes the p-norm metrics between the vectors. In one example, p=1 is used. For two-dimensional vector $\vec{v}=(v(x), v(y))$, the 1-norm distance between $\vec{v}_0$ and $\vec{v}_1$ is $$\|\vec{v}_0 - \vec{v}_1\|_{p=1} = |v_0(x) - v_1(x)| + |v_0(y) - v_1(y)| \tag{5}$$

The motion vector median filtering is applied to all available motion vectors. If a motion vector is from an erroneous macroblock, or from an intra-macroblock, or any of its sub-partition's reference index is not equal to zero, the motion vector is marked as un-available; otherwise, it is labeled available.

It should be noted that any one of the blocks illustrated in this flowchart may be omitted, rearranged in order, or combined with one or more other blocks.

Figure 3:
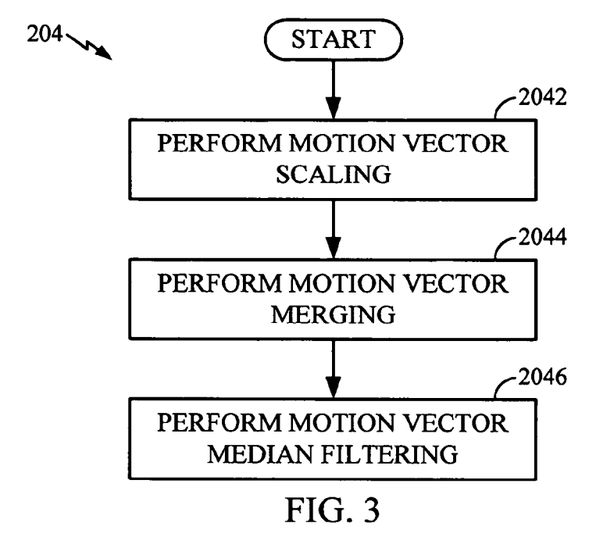
FIG. 3 is a flowchart illustrating an example of the process to generate motion vectors of the current P-frame at the block 204 of FIG. 2.

FIG. 3 is a flowchart illustrating an example of the process to generate motion vectors of the current P-frame at the block 204 of FIG. 2. Certain examples of a video communication system require the decoder to support a P-frame predicted from multiple reference frames and variable motion compensation block sizes. In such examples, one of the inputs to the decoder is the motion vector of each decoded block of variable sizes. The other input is a reference frame index (ref_idx) for each transmitted motion vector from the current decoded frame. Reference frame index information is carried in the bitstream for each motion vector, indicating the distance between the current frame and its motion vector's reference frame. In one example, there are seven valid motion compensation block sizes for each macroblock. These block sizes are 16×16, 16×8, 8×16, 8×8, 8×4, 4×8, 4×4. The process to generate motion vectors of the current P-frame provides the required support for multiple reference frames and the variable motion compensation block size by converting the input motion vectors into motion vectors based on a single immediate reference frame and a uniform compensation block size.

The method 204 begins at a block 2042 in which motion vector scaling is performed. The motion vector scaling step performs the scaling of input motion vector based on the distance between the current frame and reference frame to which the motion vector points. After motion vector scaling, all motion vectors are pointed from the current frame to its immediate reference frame, i.e., the adjacent frame to the current frame (ref_idx value equals zero). Therefore, multiple reference frames are scaled out into a single immediate reference frame. The new motion vector pointed to its immediate reference frame can be characterized as follows:

$$MV\_f\_x = MV\_x * N/M \tag{1}$$

$$MV\_f\_y = MV\_y * N/M \tag{2}$$

where MV_f_x and MV_f_y are x and y components of the new motion vector, MV_x and MV_y are x and y components of the transmitted motion vector, N is the distance from current frame to its immediate reference frame, and M is the distance from the current frame to the reference frame to which the motion vector points.

Next at a block 2044, motion vector merging is performed. Motion vector merging provides necessary support to variable block-size motion vectors. During this act, the input motion vectors of different sizes are converted into a motion vector representing a uniform block size called base unit. The size of the base unit is configurable. In some examples, a 16×16 base unit is used.

If the base unit comprises several scaled motion vector of smaller size(s), a merging operation is applied to merge the motion vectors inside the base unit to a single motion vector and assign it to the base unit. However, if a scaled motion vector is bigger than a base unit, the input motion vector is separated into several motion vectors each representing a base unit and each having the same motion vector as the scaled motion vector. Various examples are available to perform the merging operation. In one example, the new motion vector is the mean of the several scaled motion vector of smaller sizes comprised in the base unit. In another example, the new motion vector is the average of the several scaled motion vectors comprises in the base unit. After the block 2044, all the correctly decoded motion vectors are converted to single-size base unit.

Moving to a block 2046, motion vector median filtering is performed on the motion vectors from the block 2044. The previous blocks 2042 and 2044 modify the received motion vector field to a uniformed size (base unit size), single reference (all motion vector are scaled to point to the immediate reference frame from the current frame) motion field. Motion vector median filtering is performed to smooth out the singularity in the motion vector introduced by the scaling and merging operations, and therefore, yields better error concealment results. The motion vector median filtering is the same as discussed above in FIG. 2. In one example, a 3×3 motion vector median filtering (VMF) is applied to each available motion vector. Each available motion vector is replaced by the median of the motion vectors in a 3×3 block centering on that motion vector. In other examples, a different size block may be used to perform the motion vector median filtering.

In short, the present example of the process to generate motion vectors of the P-frame converts the input motion vectors of variable block sizes into base unit motion vectors and converts the multiple reference frames of each decoding frame into a single smallest index reference frame in the reference frame list.

It should be noted that any one of the blocks illustrated in this flowchart may be omitted, rearranged in order, or combined with one or more other blocks.

Figure 4:
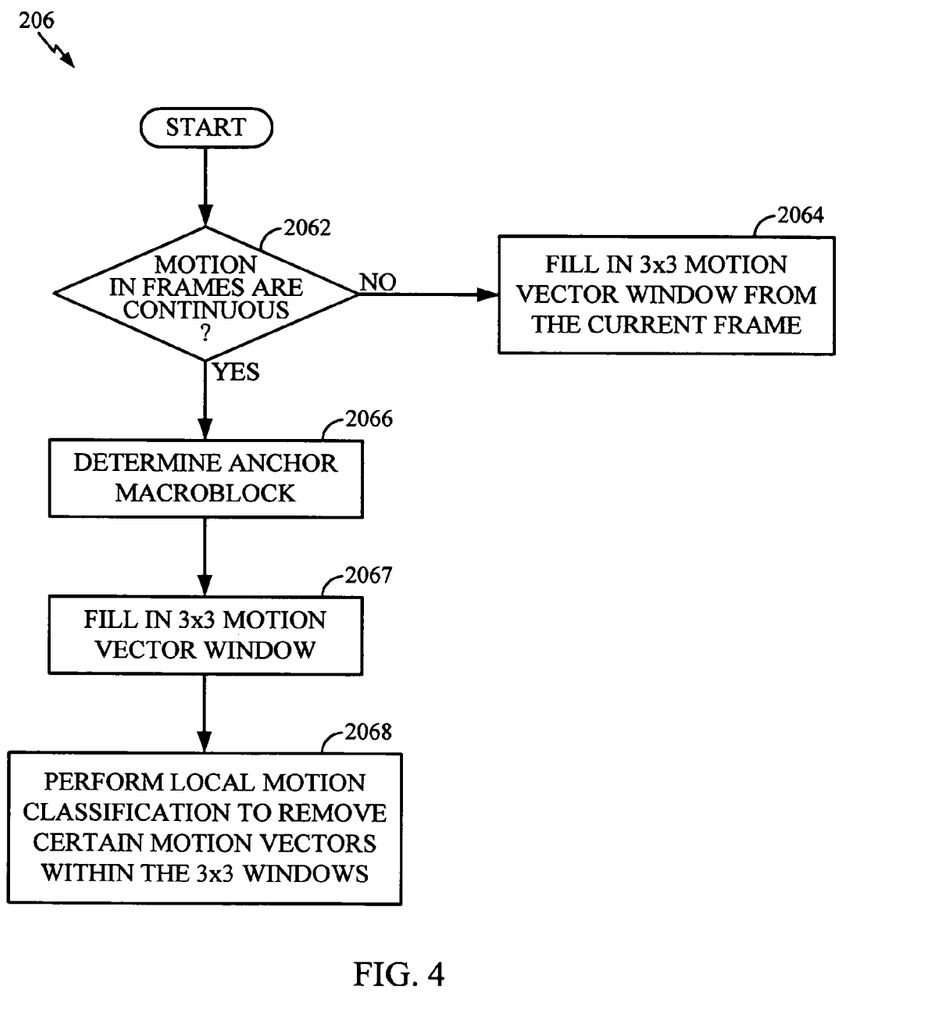
FIG. 4 is a flowchart illustrating an example of the process to form a motion vector window based on the current P-frame and a reference frame at the block 206 of FIG. 2.

FIG. 4 is a flowchart illustrating an example of the process to form a motion vector window based on the current P-frame and a reference frame at the block 206 of FIG. 2. As discussed with regard to FIG. 2, the motion vector window generated in this process may then be used to construct an estimate of the motion vector of the erroneous macroblock. In the example, the motion vector window is a 3×3 window of macroblocks, though other sizes may be used as well. In the example, the reference frame is the immediate reference frame to the current P-frame, i.e., the frame adjacent to the current P-frame. In other examples, the reference frame could be further away from the current P-frame. The method can be applied in either a causal decoding process or a non-causal decoding process.

The method 206 begins at a block 2062, in which it is determined whether motion in a current P-frame and the reference frame is continuous. The motion is continuous if the motion in the current frame does not change from the motion in the reference frame significantly.

A process similar to the method 204 as described above in FIG. 3 is applied to generate motion vectors of the reference frame. Once motion vectors of the reference frame are generated, each pair of co-located motion vectors in the current and the reference frames are then compared to determine whether motion in the current frame and the reference frame is continuous, if the pair is available. A pair of motion vectors is available if both motion vectors are received correctly. A count of similar motion vector pairs in the two frames is maintained. If the similar motion vector count is over a threshold percentage of the count of available motion vector pairs, the motions in the two frames have not changed significantly. Otherwise, frame-to-frame motion change is detected. In the example, the threshold percentage is 50%, though other number may also be used.

Each received motion vector is given a magnitude label and a direction label. In the example, the magnitude label has the value of either 0 (small magnitude) or 1 (large magnitude). A motion vector is given a magnitude label of 1 if the magnitude of the motion vector is larger than a threshold value. In the example, the threshold for deciding the magnitude label is 2 pixels, but other values may also be used. In the example, the direction label has the value of 0, 1, 2, or 3, representing one of the four major directions.

Each pair of co-located motion vectors in the two frames is compared based on their magnitude labels and direction labels. For example, the motion vectors of each pair are declared to be similar unless their magnitudes are both large and their directions are opposite. This approach overlooks directional information of small magnitude motion vectors because small motion vectors tend to randomly distributed directionally.

If the motion is determined to be not continuous, the motion vectors from the reference frame are not reliable and may not be used to estimate the motion vector of the erroneous macroblock. If the motion vectors from the reference frame are not reliable, the process goes to a block 2064, which fills in the motion vector window based on the neighboring macroblocks in the current frame. If the motion is continuous, the process goes to block 2066 and 2067 in which the motion vector window is generated based on both the reference frame and the current frame.

Moving to Block 2066, an anchor macroblock is selected in the reference frame. One example applies a co-located method, wherein the anchor macroblock is the co-located macroblock in the reference frame. The example is suitable for global motion case where all motion vectors follow the same affine model, or the situation where the motion vectors in the current frame motion vector window and the co-located motion vector window in the reference frame are both in the background region. For irregular motion with a moving object, this technique may not effectively capture the expected motion vectors for error concealment purpose. For example, if previous 3×3 window resides in a static background region, and the current frame's 3×3 window covers fully or partially a moving object, the motion vectors captured from previous reference frame by the co-located methods are irrelevant to the motion trajectory of moving object of interest. Utilization of such motion vectors from previous frame for temporal error concealment may end up with inferior results.

Another example resolves the above problem by selecting the anchor macroblock according to the motion trajectory. In this example, an anchor motion vector of the current P-frame is first determined. The anchor macroblock of the reference frame is then decided based on the anchor motion vector.

The anchor motion vector is calculated based on the availability of its three neighboring motion vectors, the motion vector from its left neighboring macroblock, the motion vector from its top neighboring macroblock and the motion vector from its top-right neighboring macroblock. If a motion vector is from an erroneous macroblock, or from an intra-coded macroblock, or any of its sub-partition's reference index is not equal to zero, the motion vector is marked as un-available; otherwise, it is labeled as available. If only one of these three neighboring macroblocks is available, the anchor motion vector is assigned as that neighboring available macroblock. Otherwise, the anchor motion vector is assigned as the median of all available motion vectors of its three neighboring motion vectors.

Once the anchor motion vector is determined, a most-covered-area method is applied to obtain the anchor macroblock in the reference frame, as will be discussed in more detail with respect to FIGS. 5A and 5B.

Once the anchor macroblock is determined, a motion vector window is selectively filled in based on the reference frame and the current P-frame at a block 2067, as will be discussed in more detail with respect to FIG. 6. In the example, the motion vector window is 3×3, but other sizes may also be used.

Moving to a block 2068, local motion classification is performed to remove certain motion vectors within the motion vector window generated in block 2067. Each available motion vector within the motion vector window is compared to the motion vector of the anchor macroblock in the reference frame to determine whether these motion vectors are similar, following the same comparison criteria as discussed above in FIG. 4. A motion vector within the motion vector window is marked as unavailable if the motion vector is not similar to the anchor macroblock in the reference frame. Therefore, the motion vector does not affect the estimate of the motion vector for the erroneous macroblock of interest.

It should be noted that any one of the blocks illustrated in this flowchart may be omitted, rearranged in order, or combined with one or more other blocks.

Figure 5A:
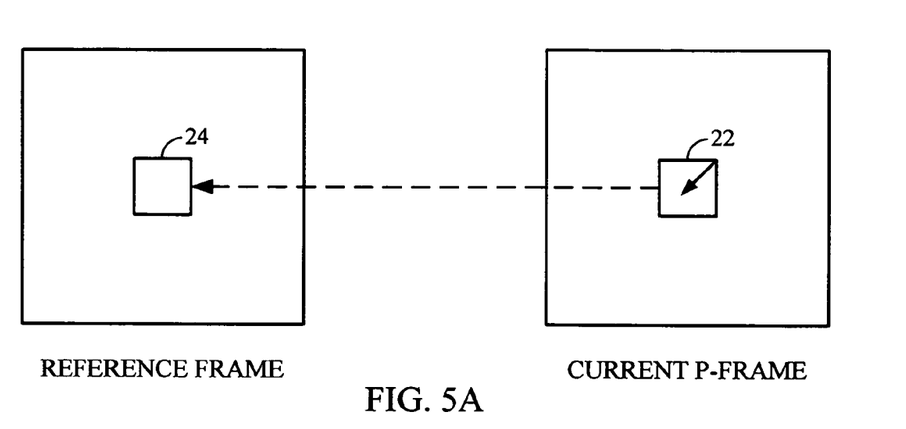
FIGS. 5A and 5B illustrate the most-covered-area method for determining the anchor macroblock at the block 2066 of FIG. 4.
Figure 5B:
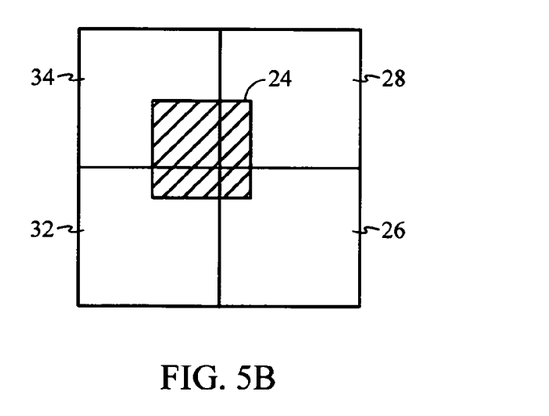

FIGS. 5A and 5B illustrate the most-covered-area method for determining the anchor macroblock at the block 2066 of FIG. 4. An anchor motion vector 22 in the current P-frame points to an area 24 of the reference frame. The area 24 covers fully or partially at most four macroblocks 26, 28, 32, and 34. Each covered macroblock is assigned a value representing its covered area by the area 24 to which the anchor motion vector points to. For example, the anchor macroblock is selected as the macroblock in the reference frame covered most by the area 24. In case more than one macroblocks are covered most by the area 24, any one of these macroblocks covered most can be selected as the anchor macroblock. In FIG. 5B, the macroblock 34 is selected as the anchor macroblock.

Figure 6:
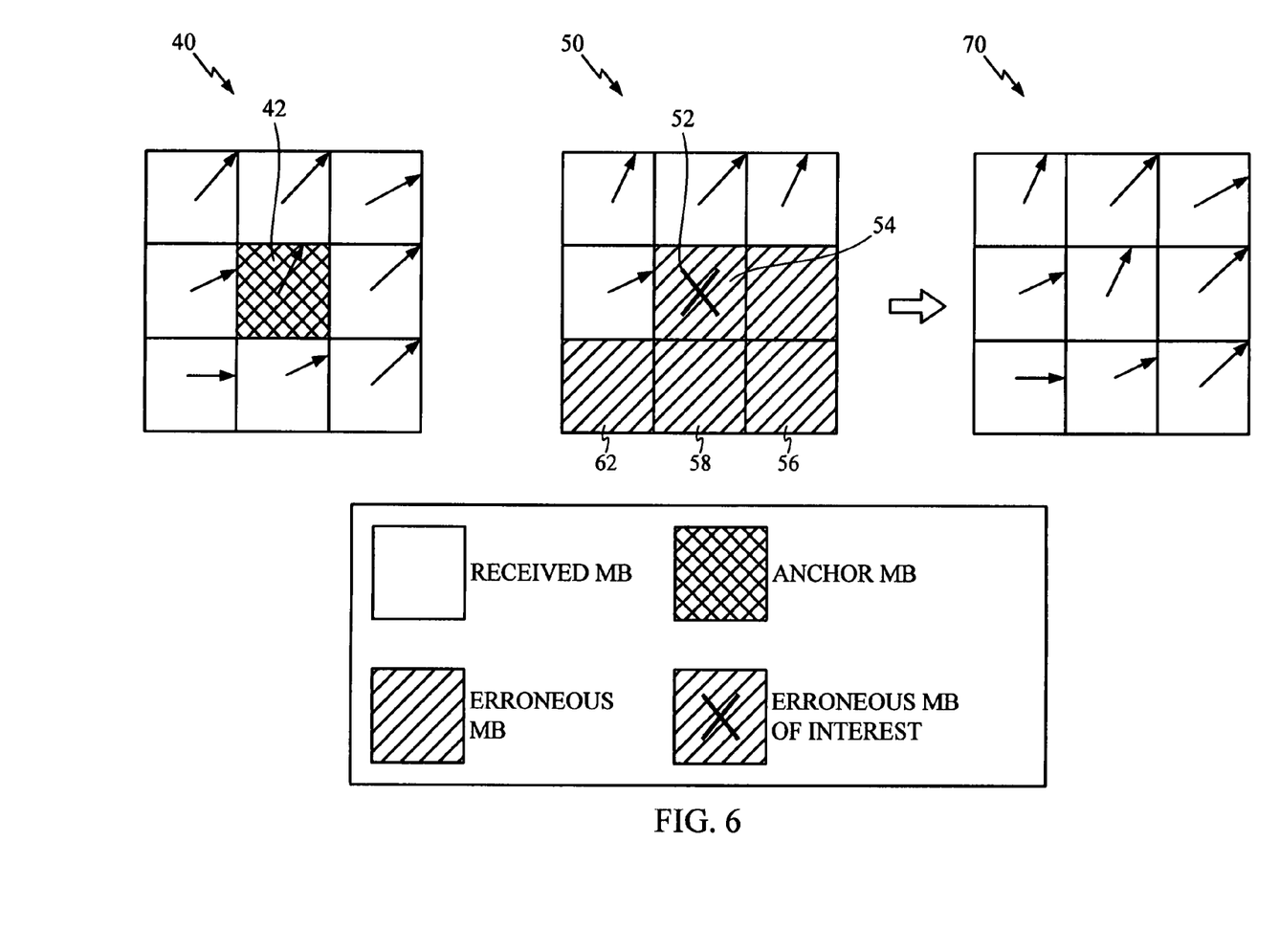
FIG. 6 illustrates the construction of the motion vector window of the block 2067 of FIG. 4.

FIG. 6 illustrates the construction of the motion vector window of the block 2067 of FIG. 4. The motion vector window 70 is constructed based on a 3×3 motion vector window 50 centered on the erroneous macroblock 52 in the current frame and a 3×3 motion vector window 40 centered on the anchor macroblock 42 in the reference frame. A motion vector in the current and reference frame is marked as unavailable if the motion vector is not correctly received. In FIG. 6, for example, the macroblocks 52, 54, 56, 58, and 62 of the current frame are unavailable. In an example of a non-causal decoding, any of the macroblocks 54, 56, 58, and 62 may be available. To fill in each block of the motion vector window 70, a motion vector of the current frame at the corresponding location is used if such a motion vector is available. Otherwise, a motion vector of the reference frame at the corresponding location is used if such a motion vector is available. In case that the motion vector of the reference frame and the motion vector of the current frame are both unavailable at the corresponding location, the block is marked as unavailable.

Figure 7A:
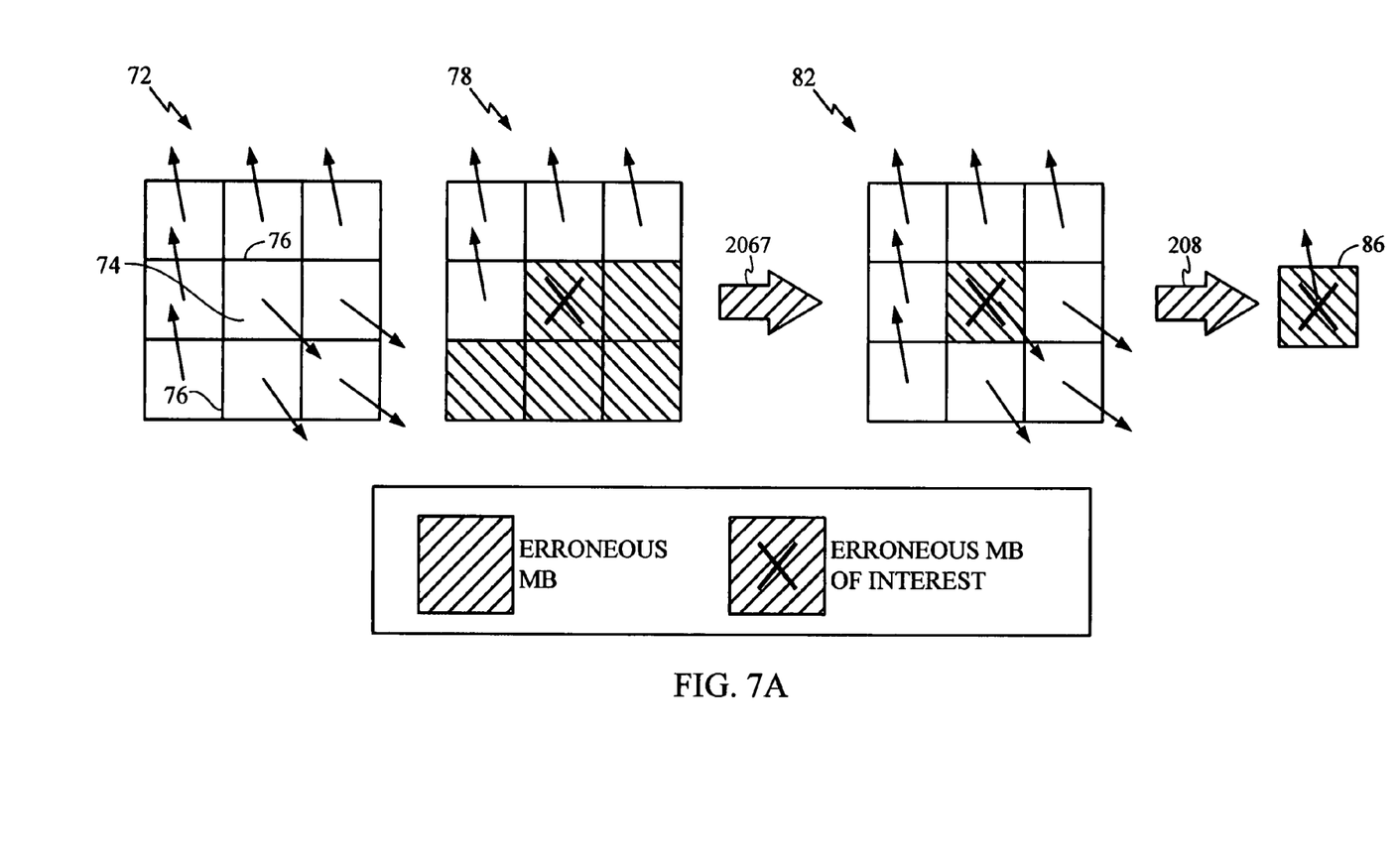
FIGS. 7A and 7B illustrate the benefit of performing local motion classification at the block 2068 of FIG. 4.
Figure 7B:
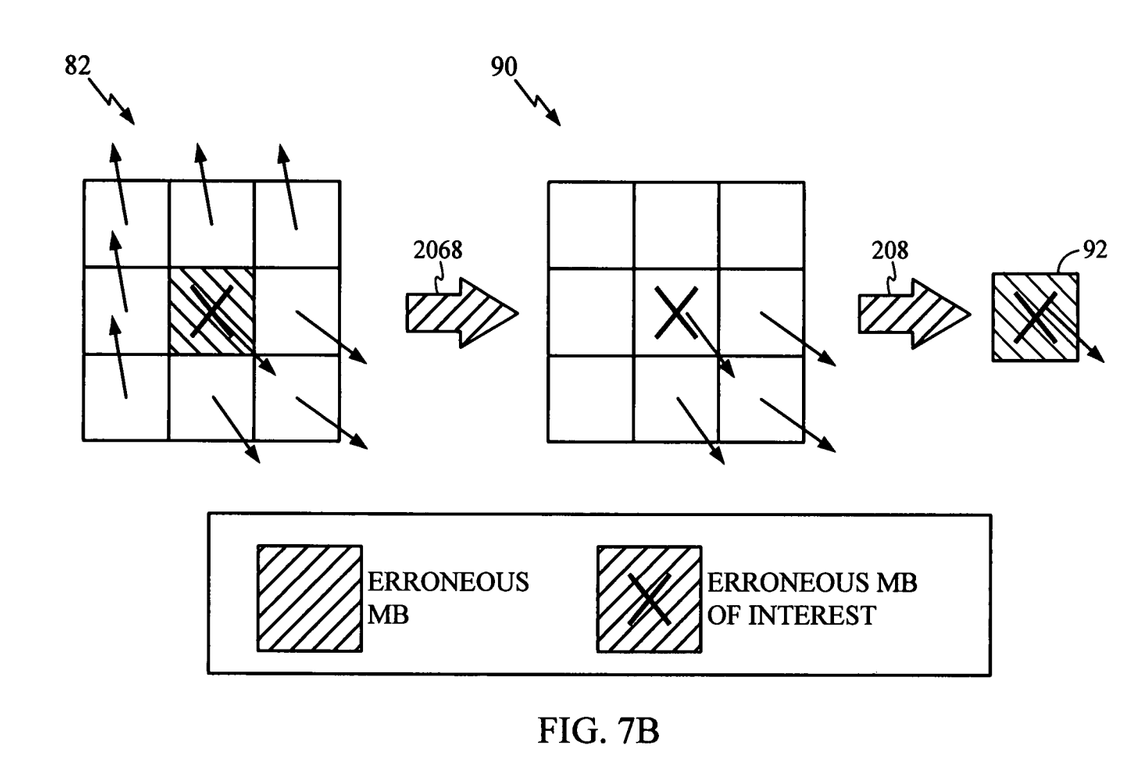

FIGS. 7A and 7B illustrate why it may be desirable to perform local motion classification according to the act in the block 2068 of FIG. 4. As illustrated in FIG. 7A, motion boundary 76 may exist in the 3×3 motion vector window 72 within the reference frame. In that case, only motion vectors that are on the same side of the motion boundary as the motion vector 74 of the anchor macroblock shall be used to estimate the motion vector of the erroneous macroblock. In FIG. 7A, a motion vector window 82 is generated at the block 2067 of FIG. 4 as discussed above. Without local motion classification, the motion vector window 82 is then used to generate the estimate motion vector 86 of the erroneous macroblock. In one example, a similar process to the act in the block 204 of FIG. 2 is applied to generate the estimate motion vector. As illustrated, the estimate motion vector 86 may not be accurate along motion edges. In FIG. 7B, the motion vector window 82 is further processed via local motion classification according the block 2068 of FIG. 4. Therefore, the motion vectors located on the other side of the motion boundary are removed in the new motion vector window 90. As a result, the estimated motion vector 92 generated based on the new window 90 is more accurate. This comparison illustrates that determining and classifying motion of local neighboring macroblocks reduces object discontinuities caused by estimating wrong motion vectors along motion edges.

Figure 8:
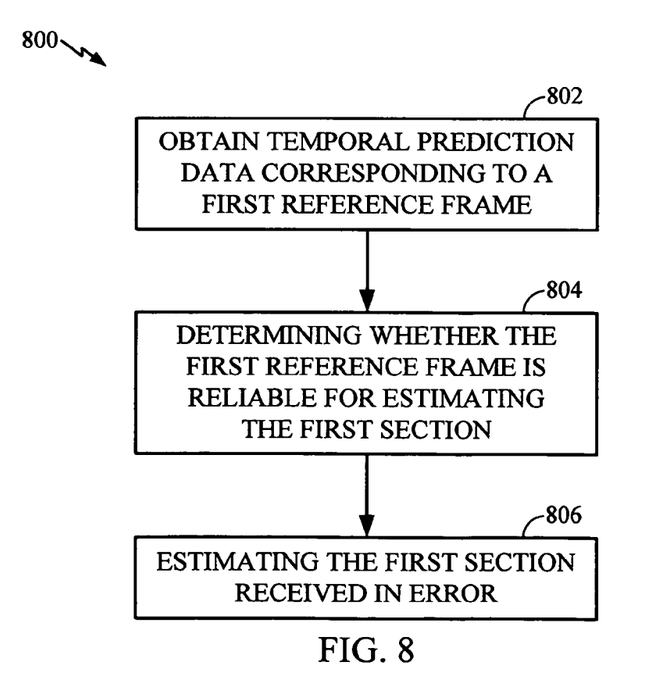
FIG. 8 is a flowchart illustrating another example of a method of processing a multimedia frame comprising a first section received in error.

FIG. 8 is a flowchart illustrating another example of a method of processing a multimedia frame comprising a first section received in error. The method begins at a block 802, in which temporal prediction data corresponding to a first reference frame is obtained. Next at a block 804, it is determined whether the first reference frame is reliable for estimating the first section. Moving to a block 806, an estimate of the first section received in error is made based on one or more sections other than the first section of the multimedia frame and the first reference frame, if it is determined that the first reference frame is reliable. The acts of these blocks are similar to the discussion above in FIGS. 1-7.

Figure 9:
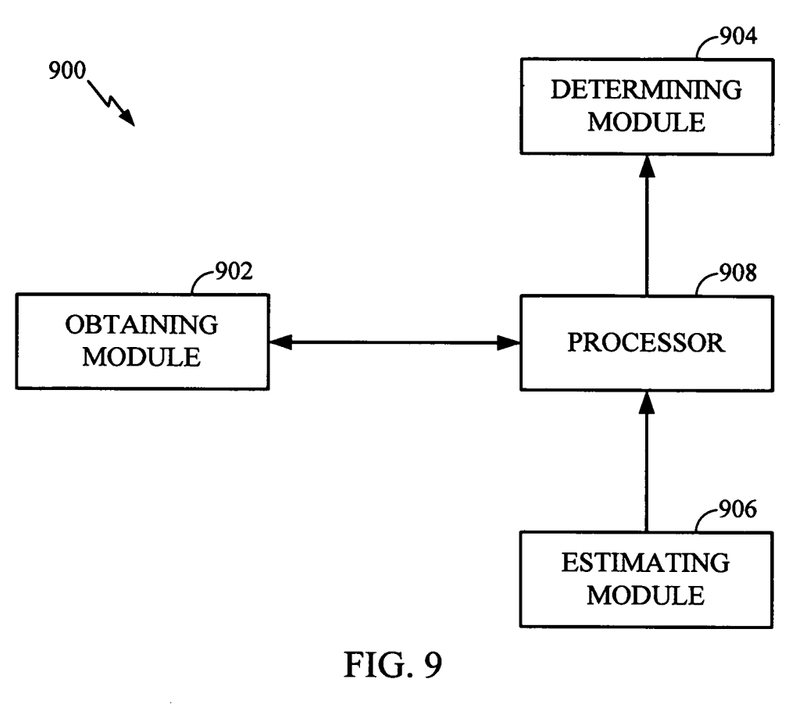
FIG. 9 shows a block diagram illustrating another example of a decoder configured to decode an incoming multimedia data stream.

FIG. 9 shows a block diagram illustrating another example of a decoder configured to decode an incoming multimedia data stream. The data stream comprises a multimedia frame, which further comprises a first section received in error. The decoder comprises an obtaining module 902, a determining module 904, an estimating module 906, and a processor 908. The obtaining module 902 is configured to obtain temporal prediction data corresponding to a first reference frame. The determining module 904 is configured to determine whether the first reference frame is reliable for estimating the first section. The estimating module 906 is configured to estimate the first section received in error based on one or more sections other than the first section of the multimedia frame and the first reference frame, if it is determined that the first reference frame is reliable. The processor 908 is configured to execute one or more software applications to control the operation of other units, as discuss earlier. In other examples, the processor 908 may be removed.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory computer-readable storage-medium known in the art. A non-transitory computer-readable storage medium is coupled to the processor such that the processor can read information from, and write information to, the storage medium. In the alternative, the non-transitory computer-readable storage medium may be integral to the processor. The processor and the non-transitory computer-readable storage medium may reside in an Application Specific Integrated Circuit (ASIC).

The ASIC may reside in a wireless modem. In the alternative, the processor and the non-transitory computer-readable storage medium may reside as discrete components in the wireless modem.

The previous description of the disclosed examples is provided to enable any person of ordinary skill in the art to make or use the disclosed methods and apparatus. Various modifications to these examples would be readily apparent to those skilled in the art, and the principles defined herein may be applied to other examples.

The invention claimed is:

1. A method of processing a multimedia frame comprising a first section received in error, comprising:
   obtaining temporal prediction data corresponding to a first reference frame in a processor;
   determining whether the first reference frame is reliable for estimating the first section; and
   estimating the first section received in error based on one or more sections other than the first section of the multimedia frame and the first reference frame, if it is determined that the first reference frame is reliable.

2. The method of claim 1, wherein the one or more sections comprises one or more neighboring sections to the first section.

3. The method of claim 1, wherein the temporal prediction data comprises motion vectors corresponding to portions of the first reference frame.

4. The method of claim 3, wherein the determining further comprises:
   determining whether each pair of motion vectors including a motion vector of the multimedia frame and a co-located motion vector within the first reference frame are similar, if the pair is available; and
   determining that the first reference frame is reliable if the ratio of the number of similar pairs over the number of available pairs is over a threshold value,
   wherein a pair of motion vectors are available if both motion vectors are received correctly.

5. The method of claim 4, wherein whether each pair is similar is determined based on at least one of the following: the magnitudes of both motion vectors or the directions of both motion vectors.

6. The method of claim 5, wherein each pair is determined to be not similar only if the magnitudes of both motion vectors are large and the directions of the motion vectors are opposite.

7. The method of claim 1, wherein each section is a macroblock.

8. The method of claim 3, further comprising scaling the motion vectors corresponding to portions of one or more reference frames from which the multimedia frame is to be predicted to motion vectors corresponding to portions of the first reference frame such that the first reference frame is adjacent to the multimedia frame.

9. The method of claim 8, further comprising smoothing at least one of the scaled motion vectors.

10. The method of claim 9, wherein the smoothing comprises median filtering.

11. The method of claim 3, wherein each frame comprises a plurality of sections and each section comprises one or more base units of the same size, the method further comprising:
   merging motion vectors corresponding to portions of variable sizes of each base unit to form one base motion vector corresponding to the base unit,
   wherein each base unit is N by M blocks of pixels, and further wherein N and M are integers.

12. The method of claim 11, wherein merging motion vectors comprises at least one of simple averaging, weighted averaging or median filtering.

13. The method of claim 11, further comprising smoothing at least one of the merged motion vectors.

14. The method of claim 13, wherein the smoothing comprises median filtering.

15. The method of claim 3, wherein the estimating further comprises:
   determining an anchor section within the first reference frame;
   determining a first motion vector window based on available motion vectors from a second motion vector window of the multimedia frame centered on the first section and from a third motion vector window of the first reference frame centered on the anchor section; and
   calculating the median of the available motion vectors within the first motion vector window.

16. The method of claim 15, further comprising updating the first motion vector window such that each motion vector is marked as unavailable if the motion vector is not similar to the motion vector of the anchor section.

17. The method of claim 16, wherein whether two motion vectors are not similar is determined based on at least one of the following: the magnitudes of both motion vectors or the directions of both motion vectors.

18. The method of claim 17, wherein two motion vectors are determined to be not similar only if the magnitudes of both motion vectors are large and the directions of both motion vectors are opposite.

19. The method of claim 15, wherein the anchor section is selected to be the section at the corresponding location to the first section of the multimedia frame.

20. The method of claim 15, wherein the anchor section is selected such that the anchor section corresponds to a section of the first reference frame having the largest overlap with an area of the first reference frame, wherein the area is pointed to by an anchor motion vector of the multimedia frame, wherein the anchor motion vector is calculated based on motion vectors of available neighboring sections within the multimedia frame.

21. The method of claim 1, further comprising estimating the first section based on one or more sections other than the first section of the multimedia frame and not based on the first reference frame, if it is determined that the first reference frame is not reliable.

22. The method of claim 1, wherein the method can be applied in both a causal decoding process and a non-causal decoding process.

23. A computer system for processing a multimedia frame, the system comprising:
   a processor; and
   a memory coupled to the processor,
   wherein the processor is operable to:
      obtain temporal prediction data corresponding to a first reference frame;
      determine whether the first reference frame is reliable for estimating a first section received in error based; and
      estimate the first section received in error based on one or more sections other than the first section of the multimedia frame and the first reference frame, if it is determined that the first reference frame is reliable.

24. The system of claim 23, wherein the one or more sections comprises one or more neighboring sections to the first section.

25. The system of claim 23, wherein the temporal prediction data comprises motion vectors corresponding to portions of the first reference frame.

26. The system of claim 25, wherein the processor is further operable to:
determine whether each pair of motion vectors including a motion vector of the multimedia frame and a co-located motion vector within the first reference frame are similar, if the pair is available; and
determine that the first reference frame is reliable if the ratio of the number of similar pairs over the number of available pairs is over a threshold value,
wherein a pair of motion vectors are available if both motion vectors are received correctly.

27. The system of claim 26, wherein whether each pair is similar is determined based on at least one of the following:
the magnitudes of both motion vectors or the directions of both motion vectors.

28. The system of claim 27, wherein each pair is determined to be not similar only if the magnitudes of both motion vectors are large and the directions of the motion vectors are opposite.

29. The system of claim 23, wherein each section is a macroblock.

30. The system of claim 25, the processor is further operable to:
scale the motion vectors corresponding to portions of one or more reference frames from which the multimedia frame is to be predicted to motion vectors corresponding to portions of the first reference frame such that the first reference frame is adjacent to the multimedia frame.

31. The system of claim 30, wherein the processor is further operable to:
smooth at least one of the scaled motion vectors.

32. The system of claim 31, wherein the smoothing comprises median filtering.

33. The system of claim 25, wherein each frame comprises a plurality of sections and each section comprises one or more base units of the same size, and wherein the processor is further operable to:
merge motion vectors corresponding to portions of variable sizes of each base unit to form one base motion vector corresponding to the base unit,
wherein each base unit is N by M blocks of pixels, and further wherein N and M are integers.

34. The system of claim 33, wherein merging motion vectors comprises at least one of simple averaging, weighted averaging or median filtering.

35. The system of claim 33, wherein the processor is further operable to smooth at least one of the merged motion vectors.

36. The system of claim 35, wherein the smoothing comprises median filtering.

37. The system of claim 25, wherein the processor is further operable to:
determine an anchor section within the first reference frame;
determine a first motion vector window based on available motion vectors from a second motion vector window of the multimedia frame centered on the first section and from a third motion vector window of the first reference frame centered on the anchor section; and
calculate the median of the available motion vectors within the first motion vector window.

38. The system of claim 37, the wherein the processor is further operable to update the first motion vector window such that each motion vector is marked as unavailable if the motion vector is not similar to the motion vector of the anchor section.

39. The system of claim 38, wherein whether two motion vectors are not similar is determined based on at least one of the following:
the magnitudes of both motion vectors or the directions of both motion vectors.

40. The system of claim 39, wherein two motion vectors are determined to be not similar only if the magnitudes of both motion vectors are large and the directions of both motion vectors are opposite.

41. The system of claim 37, wherein the anchor section is selected to be the section at the corresponding location to the erroneous first section of the multimedia frame.

42. The system of claim 37, wherein the anchor section is selected such that the anchor section corresponds to a section of the first reference frame having the largest overlap with an area of the first reference frame, wherein the area is pointed to by an anchor motion vector of the predicted frame, wherein the anchor motion vector is calculated based on motion vectors of available neighboring sections within the multimedia frame.

43. The system of claim 23, the wherein the processor is further operable to estimate the first section based on one or more sections other than the first section of the multimedia frame and not based on the first reference frame, if it is determined that the first reference frame is not reliable.

44. The system of claim 23, wherein the operations of the processor can be applied in both a causal decoding process and a non-causal decoding process.

45. An apparatus for processing a multimedia frame comprising a first section received in error, comprising:
means for obtaining temporal prediction data corresponding to a first reference frame;
means for determining whether the first reference frame is reliable for estimating the first section; and
means for estimating the first section received in error based on one or more sections other than the first section of the multimedia frame and the first reference frame, if it is determined that the first reference frame is reliable.

46. The apparatus of claim 45, wherein the one or more sections comprises one or more neighboring sections to the first section.

47. The apparatus of claim 45, wherein the temporal prediction data comprises motion vectors corresponding to portions of the first reference frame.

48. The apparatus of claim 47, wherein the means for determining further comprises:
means for determining whether each pair of motion vectors including a motion vector of the multimedia frame and a co-located motion vector within the first reference frame are similar, if the pair is available; and
means for determining that the first reference frame is reliable if the ratio of the number of similar pairs over the number of available pairs is over a threshold value,
wherein a pair of motion vectors are available if both motion vectors are received correctly.

49. The apparatus of claim 48, wherein whether each pair is similar is determined based on at least one of the following:
the magnitudes of both motion vectors or the directions of both motion vectors.

50. The apparatus of claim 49, wherein each pair is determined to be not similar only if the magnitudes of both motion vectors are large and the directions of the motion vectors are opposite.

51. The apparatus of claim 45, wherein each section is a macroblock.

52. The apparatus of claim 47, further comprising means for scaling the motion vectors corresponding to portions of one or more reference frames from which the multimedia frame is to be predicted to motion vectors corresponding to portions of the first reference frame such that the first reference frame is adjacent to the multimedia frame.

53. The apparatus of claim 52, further comprising means for smoothing at least one of the scaled motion vectors.

54. The apparatus of claim 53, wherein the means for smoothing comprises means for median filtering.

55. The apparatus of claim 47, wherein each frame comprises a plurality of sections and each section comprises one or more base units of the same size, further comprising:
means for merging motion vectors corresponding to portions of variable sizes of each base unit to form one base motion vector corresponding to the base unit,
wherein each base unit is N by M blocks of pixels, and further wherein N and M are integers.

56. The apparatus of claim 55, wherein the means for merging motion vectors comprises means for at least one of simple averaging, weighted averaging or median filtering.

57. The apparatus of claim 55, further comprising means for smoothing at least one of the merged motion vectors.

58. The apparatus of claim 57, wherein the means for smoothing comprises means for median filtering.

59. The apparatus of claim 47, wherein the means for estimating further comprises:
means for determining an anchor section within the first reference frame;
means for determining a first motion vector window based on available motion vectors from a second motion vector window of the multimedia frame centered on the first section and from a third motion vector window of the first reference frame centered on the anchor section; and
means for calculating the median of the available motion vectors within the first motion vector window.

60. The apparatus of claim 59, further comprising means for updating the first motion vector window such that each motion vector is marked as unavailable if the motion vector is not similar to the motion vector of the anchor section.

61. The apparatus of claim 60, wherein whether two motion vectors are not similar is determined based on at least one of the following:
the magnitudes of both motion vectors or the directions of both motion vectors.

62. The apparatus of claim 61, wherein two motion vectors are determined to be not similar only if the magnitudes of both motion vectors are large and the directions of both motion vectors are opposite.

63. The apparatus of claim 59, wherein the anchor section is selected to be the section at the corresponding location to the erroneous first section of the multimedia frame.

64. The apparatus of claim 59, wherein the anchor section is selected such that the anchor section corresponds to a section of the first reference frame having the largest overlap with an area of the first reference frame, wherein the area is pointed to by an anchor motion vector of the predicted frame, wherein the anchor motion vector is calculated based on motion vectors of available neighboring sections within the multimedia frame.

65. The apparatus of claim 45, further comprising means for estimating the first section based on one or more sections other than the first section of the multimedia frame and not based on the first reference frame, if it is determined that the first reference frame is not reliable.

66. The apparatus of claim 45, wherein the apparatus can be used in both a causal decoding process and a non-causal decoding process.

67. A non-transitory computer-readable storage medium having stored thereon computer executable instructions configured to cause a computer to perform operations for processing a multimedia frame comprising a first section received in error, the operations comprising:
obtaining temporal prediction data corresponding to a first reference frame;
determining whether the first reference frame is reliable for estimating the first section received in error; and
estimating the first section received in error based on one or more sections other than the first section of the multimedia frame and the first reference frame, if it is determined that the first reference frame is reliable.

68. The non-transitory computer-readable storage medium of claim 67, wherein the one or more sections comprises one or more neighboring sections to the first section.

69. The non-transitory computer-readable storage medium of claim 67, wherein the temporal prediction data comprises motion vectors corresponding to portions of the first reference frame.

70. The non-transitory computer-readable storage medium of claim 69, wherein the stored computer executable instructions are configured to cause a computer to perform operations such that determining whether the first reference frame is reliable for estimating the first section further comprises:
determining whether each pair of motion vectors including a motion vector of the multimedia frame and a co-located motion vector within the first reference frame are similar, if the pair is available; and
determining that the first reference frame is reliable if the ratio of the number of similar pairs over the number of available pairs is over a threshold value, wherein a pair of motion vectors are available if both motion vectors are received correctly.

71. The non-transitory computer-readable storage medium of claim 70, wherein whether each pair is similar is determined based on at least one of the following: the magnitudes of both motion vectors or the directions of both motion vectors.

72. The non-transitory computer-readable storage medium of claim 71, wherein each pair is determined to be not similar only if the magnitudes of both motion vectors are large and the directions of the motion vectors are opposite.

73. The non-transitory computer-readable storage medium of claim 67, wherein each section is a macroblock.

74. The non-transitory computer-readable storage medium of claim 69, wherein the stored computer executable instructions configured to cause a computer to perform operations further comprising scaling the motion vectors corresponding to portions of one or more reference frames from which the multimedia frame is to be predicted to motion vectors corresponding to portions of the first reference frame such that the first reference frame is adjacent to the multimedia frame.

75. The non-transitory computer-readable storage medium of claim 74, the stored computer executable instructions configured to cause a computer to perform operations further comprising smoothing at least one of the scaled motion vectors.

76. The non-transitory computer-readable storage medium of claim 75, wherein smoothing at least one of the scaled motion vectors comprises median filtering.

77. The non-transitory computer-readable storage medium of claim 69, wherein each frame comprises a plurality of sections and each section comprises one or more base units of the same size, and the stored computer executable instructions configured to cause a computer to perform operations further comprising:
  merging motion vectors corresponding to portions of variable sizes of each base unit to form one base motion vector corresponding to the base unit,
  wherein each base unit is N by M blocks of pixels, and further wherein N and M are integers.

78. The non-transitory computer-readable storage medium of claim 77, wherein merging motion vectors comprises at least one of simple averaging, weighted averaging or median filtering.

79. The non-transitory computer-readable storage medium of claim 77, the stored computer executable instructions configured to cause a computer to perform operations further comprising smoothing at least one of the merged motion vectors.

80. The non-transitory computer-readable storage medium of claim 79, wherein smoothing at least one of the merged motion vectors comprises median filtering.

81. The non-transitory computer-readable storage medium of claim 69, wherein the stored computer executable instructions are configured to cause a computer to perform operations such that estimating the first section received in error further comprises:
  determining an anchor section within the first reference frame;
  determining a first motion vector window based on available motion vectors from a second motion vector window of the multimedia frame centered on the first section and from a third motion vector window of the first reference frame centered on the anchor section; and
  calculating the median of the available motion vectors within the first motion vector window.

82. The non-transitory computer-readable storage medium of claim 81, wherein the stored computer executable instructions are configured to cause a computer to perform operations further comprising updating the first motion vector window such that each motion vector is marked as unavailable if the motion vector is not similar to the motion vector of the anchor section.

83. The non-transitory computer-readable storage medium of claim 82, wherein whether two motion vectors are not similar is determined based on at least one of the following: the magnitudes of both motion vectors or the directions of both motion vectors.

84. The non-transitory computer-readable storage medium of claim 83, wherein two motion vectors are determined to be not similar only if the magnitudes of both motion vectors are large and the directions of both motion vectors are opposite.

85. The non-transitory computer-readable storage medium of claim 81, wherein the anchor section is selected to be the section at the corresponding location to the erroneous first section of the multimedia frame.

86. The non-transitory computer-readable storage medium of claim 81, wherein the anchor section is selected such that the anchor section corresponds to a section of the first reference frame having the largest overlap with an area of the first reference frame, wherein the area is pointed to by an anchor motion vector of the predicted frame, wherein the anchor motion vector is calculated based on motion vectors of available neighboring sections within the multimedia frame.

87. The non-transitory computer-readable storage medium of claim 67, wherein the stored computer executable instructions are configured to cause a computer to perform operations further comprising estimating the first section based on one or more sections other than the first section of the multimedia frame and not based on the first reference frame, if it is determined that the first reference frame is not reliable.

88. The non-transitory computer-readable storage medium of claim 67, wherein the stored computer executable instructions are further configured such that the instructions can be applied in both a causal decoding process and a non-causal decoding process.

89. A device for processing a multimedia frame comprising a first section received in error, comprising:
  a temporal prediction data generator configured to obtain temporal prediction data corresponding to a first reference frame;
  a frame motion change detector configured to determine whether the first reference frame is reliable for estimating the first section; and
  a motion vector estimator configured to estimating the first section received in error based on one or more sections other than the first section of the multimedia frame and the first reference frame, if it is determined that the first reference frame is reliable.

90. The device of claim 89, wherein the one or more sections comprises one or more neighboring sections to the first section.

91. The device of claim 89, wherein the temporal prediction data comprises motion vectors corresponding to portions of the first reference frame.

92. The device of claim 91, wherein the frame motion change detector is further configured to:
  determine whether each pair of motion vectors including a motion vector of the multimedia frame and a co-located motion vector within the first reference frame are similar, if the pair is available; and
  determine that the first reference frame is reliable if the ratio of the number of similar pairs over the number of available pairs is over a threshold value,
  wherein a pair of motion vectors are available if both motion vectors are received correctly.

93. The device of claim 92, wherein whether each pair is similar is determined based on at least one of the following: the magnitudes of both motion vectors or the directions of both motion vectors.

94. The device of claim 93, wherein each pair is determined to be not similar only if the magnitudes of both motion vectors are large and the directions of the motion vectors are opposite.

95. The device of claim 89, wherein each section is a macroblock.

96. The device of claim 91, further comprising a processor configured to scale the motion vectors corresponding to portions of one or more reference frames from which the multimedia frame is to be predicted to motion vectors corresponding to portions of the first reference frame such that the first reference frame is adjacent to the multimedia frame.

97. The device of claim 96, wherein the processor is further configured to smooth at least one of the scaled motion vectors.

98. The device of claim 96, wherein the processor is further configured to smooth at least one of the scaled motion vectors by performing median filtering on at least one of the scaled motion vectors.

99. The device of claim 91, wherein each frame comprises a plurality of sections and each section comprises one or more base units of the same size, and further comprising a processor configured to:
  merge motion vectors corresponding to portions of variable sizes of each base unit to form one base motion vector corresponding to the base unit, wherein each base unit is N by M blocks of pixels, and further wherein N and M are integers.

100. The device of claim 99, wherein the processor is further configured to merge the motion vectors by performing at least one of simple averaging, weighted averaging, or median filtering.

101. The device of claim 99, wherein the processor is further configured to smooth at least one of the merged motion vectors.

102. The device of claim 101, wherein the processor is further configured to smooth at least one of the merged motion vectors by performing median filtering.

103. The device of claim 101, wherein the motion vector estimator is further configured to:
  determine an anchor section within the first reference frame;
  determine a first motion vector window based on available motion vectors from a second motion vector window of the multimedia frame centered on the first section and from a third motion vector window of the first reference frame centered on the anchor section; and
  calculate the median of the available motion vectors within the first motion vector window.

104. The device of claim 103, wherein the motion vector estimator is further configured to update the first motion vector window such that each motion vector is marked as unavailable if the motion vector is not similar to the motion vector of the anchor section.

105. The device of claim 104, wherein whether two motion vectors are not similar is determined based on at least one of the following: the magnitudes of both motion vectors or the directions of both motion vectors.

106. The device of claim 105, wherein two motion vectors are determined to be not similar only if the magnitudes of both motion vectors are large and the directions of both motion vectors are opposite.

107. The device of claim 103, wherein the anchor section is selected to be the section at the corresponding location to the erroneous first section of the multimedia frame.

108. The device of claim 103, wherein the anchor section is selected such that the anchor section corresponds to a section of the first reference frame having the largest overlap with an area of the first reference frame, wherein the area is pointed to by an anchor motion vector of the predicted frame, wherein the anchor motion vector is calculated based on motion vectors of available neighboring sections within the multimedia frame.

109. The device of claim 89, further comprising a processor configured to estimate the first section based on one or more sections other than the first section of the multimedia frame and not based on the first reference frame, if it is determined that the first reference frame is not reliable.

110. The device of claim 89, wherein the device can be used in both a causal decoding process and a non-causal decoding process.

* * * * *